S W. SCOTT.
PNEUMATIC WHEEL.
APPLICATION FILED OCT. 17, 1912.

1,073,177.

Patented Sept. 16, 1913.

Witnesses

Inventor
S W. Scott
By Victor J. Evans
Attorney

UNITED STATES PATENT OFFICE.

S. WALTER SCOTT, OF TROY, NEW YORK.

PNEUMATIC WHEEL.

1,073,177.

Specification of Letters Patent. Patented Sept. 16, 1913.

Application filed October 17, 1912. Serial No. 726,305.

*To all whom it may concern:*

Be it known that I, S WALTER SCOTT, a citizen of the United States, residing at Troy, in the county of Rensselaer and State of New York, have invented new and useful Improvements in Pneumatic Wheels, of which the following is a specification.

This invention relates to pneumatic wheels, the object in view being to provide a wheel in which the pneumatic cushion is protected from wear on the tread and sides thereof, and also prevented from being punctured, said pneumatic cushion being effectively guarded and protected at all points, while at the same time it is placed in such a position that it absorbs all jar and vibration in the same manner as the ordinary pneumatic tire now in common use.

With the above and other objects in view, the invention consists in the construction, combination and arrangement of parts, as will be hereinafter more fully described, illustrated in the accompanying drawings, and pointed out in the claim hereunto appended.

Figure 1:
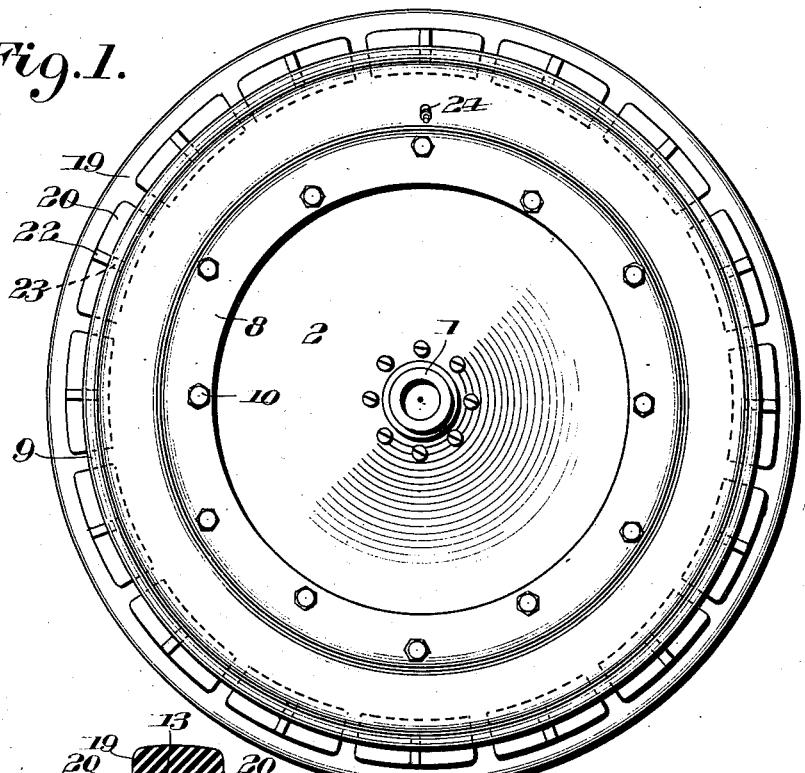
Figure 2:
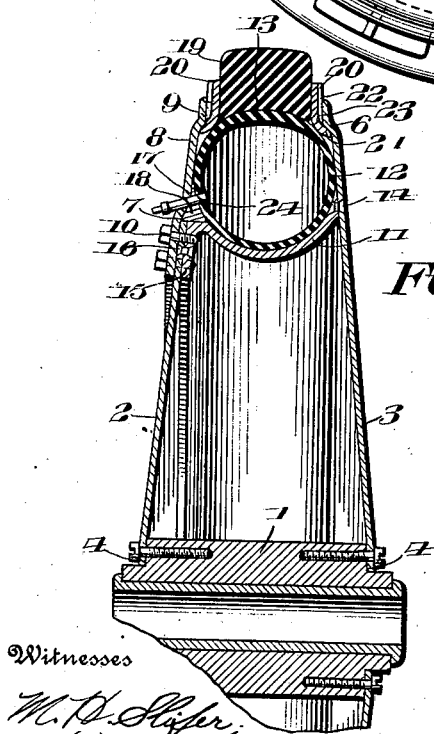
Figure 3:
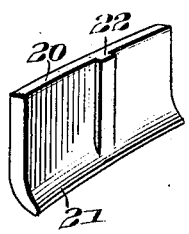

In the drawings: Figure 1 is a side elevation of a wheel embodying the present invention. Fig. 2 is a cross section through the same. Fig. 3 is a detail perspective view of one of the shoes.

The wheel contemplated in this invention embodies essentially a hub 1, and two side plates or sections 2 and 3, the latter being in the form of disks and composed of sheet metal of any suitable gage or thickness, the said plates being provided with central openings to receive the end portions of the hub 1, and the latter being provided with annular rabbets, as shown at 4, adapting the inner edges of the plates 2 and 3 to be fixedly secured to the hub 1 by means of screws 5, or their equivalent.

The plate 3 is continuous from its inner to its outer edge, the outer edge thereof being deflected inwardly to form a stop flange 6. The other plate 3 is of less diameter than the plate 2, the same terminating at the point 7. To the plate 2 is applied a detachable marginal section 8, which has its outer edge deflected inwardly to form a stop flange 9 similar to the flange 6 on the oppositely located plate 3.

The detachable marginal section 8 is of circular or annular form, and is detachably fastened to the plate 2 by means of cap screws 10. The plates 2 and 3 converge toward their outer marginal edges, and at a point some distance within said marginal edges, the plates 2 and 3 are permanently connected together by a concavo-convex rim 11, forming the seat for an inflatable air or composition filled tube or cushion 12, the outer tread portion 13 of which is preferably thickened or reinforced to take the extra wear imposed thereon.

By reference to Fig. 2, it will be observed that the rim 11 is beveled at one side, so as to merge into the plate 3, to which it is secured by rivets 14, or their equivalent. The opposite side of the rim is bent inward to form a flange 15 which is secured to the plate 2 by rivets 16, or other suitable fasteners. This leaves a triangular shaped annular cavity or space 17, at one side of the wheel and within the detachable marginal section 8, in which a seat ring 18 of any suitable material, such as wood, is placed, said ring acting as a seat for preserving the general shape of the pneumatic tube 12 above referred to.

24 represents the inflating valve tube.

Encircling the pneumatic tube 12 is a tire 19, preferably of solid rubber, although other material may be used if desired, said tire bearing directly against the tread surface 13 of the pneumatic tube, as shown in Fig. 2.

Secured to opposite sides of the tire 19 are metal shoes 20, the inner edges of which are deflected outwardly to form stop shoulders 21 which coöperate with and work against the stop flanges 9 to center the tire 19 and prevent the same from working out from between the side plates 2 and 3. Each of the shoes 20 is provided with a tongue 22 in the outer face thereof and extending radially with respect to the center of the wheel. The opposite side plates of the wheel are provided with grooves 23 at the inner side thereof, which receive the tongues 20 and work lengthwise thereof as the tire is compressed by reason of the weight imposed thereon. The tongue and groove engagement referred to maintains a perfect relation between the tire and the remainder of the wheel, and also prevents circumferential creeping of the tire, which would have a tendency to cause undue friction and wear upon the tread surface of the pneumatic tube 12.

While I have hereinabove described the preferred embodiment of this invention, it will be apparent that the wheel is susceptible to changes in the proportion and minor details of construction, which may be resorted to without departing from the principle or sacrificing any of the advantages of the invention.

What is claimed is:

A wheel, comprising a hub, metal side plates secured to the hub and converging toward their outer edges, said outer edges being deflected inwardly forming stop flanges, a concavo-convex rim connecting the side plates at a distance from the outer edges thereof and provided along one edge with an inwardly extending flange fastened to the inner side of the outer margin of one of the side plates, said one of the side plates embodying a detachable annular outer section forming a complemental part of the inner section and overlapping said inner section upon the outside opposite the junction of said inner section with the inwardly extending rim flange and secured thereto, a resilient tube seated in said rim between one side plate and the detachable section of the other side plate, a solid tire encircling and supported by said tube, and metal shoes secured directly to the opposite sides of the tire upon the outside only thereof and moving in contact with said stop flanges, said flanges and shoes having a tongue and groove sliding engagement in a radial direction.

In testimony whereof I affix my signature in presence of two witnesses.

S WALTER SCOTT.

Witnesses:
 JOSEPH E. HOBER,
 GUY C. VITTY.